Feb. 28, 1928.

F. WARREN

LUBRICATING DEVICE

Filed Nov. 1, 1926

1,660,943

INVENTOR

Frank Warren

Patented Feb. 28, 1928.

1,660,943

UNITED STATES PATENT OFFICE.

FRANK WARREN, OF SEATTLE, WASHINGTON, ASSIGNOR TO THE DERBY COMPANY, OF SEATTLE, WASHINGTON.

LUBRICATING DEVICE.

Application filed November 1, 1926. Serial No. 145,429.

My invention relates to improvements in lubricating devices for use in connection with internal combustion engines to furnish liquid lubricant along with the fuel charge for the purpose of lubricating the valves and upper portions of the engine cylinders, and said invention is an improvement on the lubricating device disclosed in the co-pending application of Charles R. Lumley filed November 1, 1926, Serial No. 145,436.

The object of my invention is to improve and simplify the construction of lubricating devices of this nature and to so construct the same that they may be easily and inexpensively manufactured.

Another object is to provide a lubricating device of the constant level vacuum type in which the air that serves as a vehicle for carrying the oil from said lubricating device is caused to pass downwardly into the oil to a point near the bottom of the oil receptacle through a conduit that is carried by a float therein.

Other and more specific objects will be apparent from the following description taken in connection with the accompanying drawings wherein—

Figure 1:
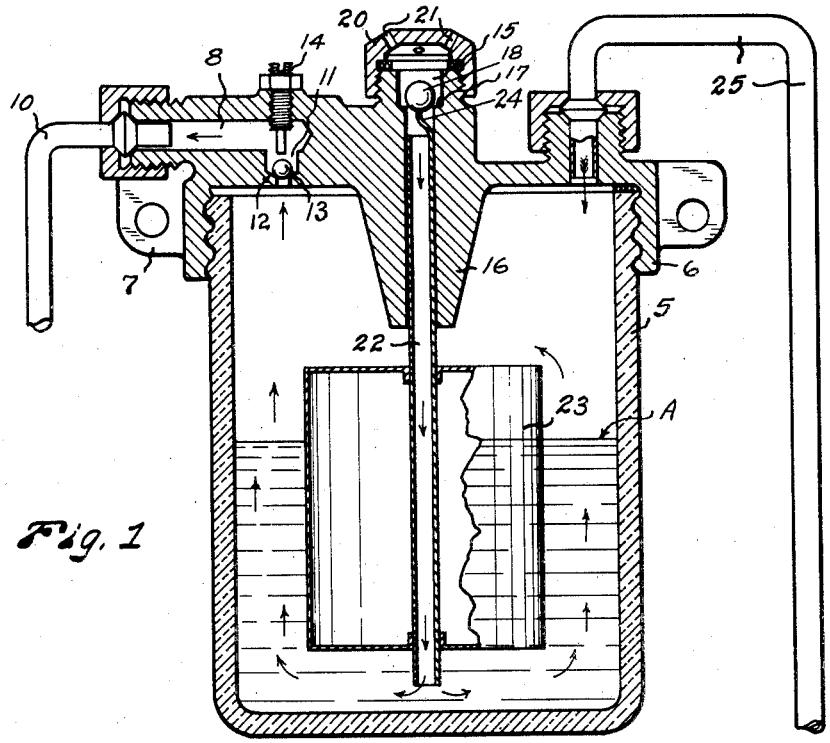
Figure 2:
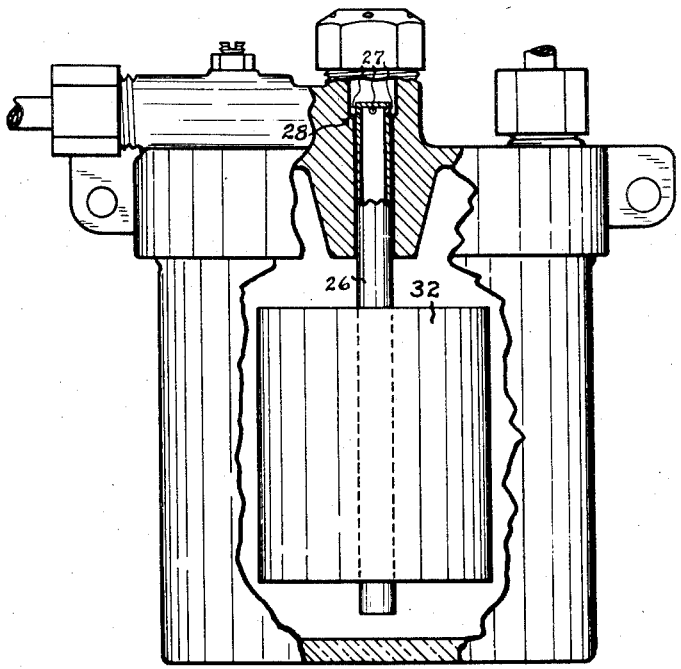

Fig. 1 is a view in vertical central section of a lubricating device constructed in accordance with my invention, and Fig. 2 is a view partly in section and partly in elevation showing a modified form of the air inlet valve.

Referring to the drawings, throughout which like reference numerals designate like parts, 5 is a receptacle or oil cup and 6 is a cover adapted to screw onto or otherwise fit the top of said receptacle in such a manner as to render the receptacle air tight except for a valve hereinafter described. The cover 6 carries substantially all of the operative parts of the lubricating device as hereinafter described, and said cover has external brackets 7 by which it may be secured to a support as to the cowl of a motor vehicle.

The cover is provided with a normally horizontal passageway 8 that is connected with a vacuum pipe or conduit 10 which leads to, and communicates with, the fuel intake of an internal combustion engine, not shown, in such a manner that the suction of the engine will be exerted through said pipe 10 when the engine is running. A normally vertical passageway 11 extends through the cover 6 and intersects the passageway 8. A valve seat 12 for the reception of a ball check valve 13 is formed in the lower end of the vertical passageway 11 and a screw 14 is provided above the valve 13 for limiting the amount of opening of the valve 13 and for preventing displacement of said valve. The screw 14 is adjustable from the exterior of the cover 5. By this arrangement it will be seen that oil laden air from the interior of the oil receptacle may be drawn through the pipe 10 to an engine but that no air nor gas can enter the oil receptacle from this pipe on account of the checking action of the valve 13.

The cover 6 is further provided with a vertical passageway 15, preferably axially arranged, that extends from the top of said cover downwardly through a boss 16 carried by the cover. A valve seat 17 is provided in the upper end of the passageway 15 for the reception of a ball check valve 18 which prevents the intake of air unless it is held in an open position. A cap 20 having air inlet perforations 21 serves as a cover for the passageway 15 and as a means for preventing displacement of the valve 18.

22 is a tubular float stem secured to a float 23 and slidably disposed within the air inlet passageway 15. The upper end of the float stem 22 has a means 24 for engaging and lifting the valve 18 and the lower end of said float stem is open and extends to a point near the bottom of the receptacle 5 so that the air entering through the perforations 21 and passing the valve 18 will be drawn down through the tubular stem 22 and out of the bottom end thereof and will rise or bubble up through the oil, picking up or becoming saturated with the oil and thence passing through the pipe 10 to the combustion chamber of the engine. The float 23 is supported by the oil in the receptacle 5 and as said float is raised and lowered by fluctuations of the oil level in said receptacle the tubular stem will move up and down in the air passageway 15 engaging with and opening the valve 18 as the float is raised and permitting said valve to close as the float is lowered. The vertical movement of the float is relatively slight in operation.

An oil inlet conduit 25 connects the upper end of the receptacle 5 with any suitable oil supply receptacle, not shown, that is located so that the oil can not flow by gravity but may be drawn by suction into the receptacle 5.

In the operation of this device when suction is exerted through the pipe 10 and the valve 18 is closed, oil will be drawn in through the pipe 25. As the oil rises in said receptacle it will lift the float 23 and cause the member 24 on the upper end of the stem 22 to engage with and lift the valve 18. This permits air to be drawn down through the tubular stem 22 and out at the bottom end of the same. This air passes up through the oil picking up particles of the oil and is finally drawn off through the pipe 10. The air thus furnished by the opening of the valve 18 relieves the vacuum in the receptacle 5 sufficiently so that the intake of oil is stopped or reduced to such an extent as to only furnish enough oil to keep the oil level A in the receptacle substantially constant. The float 23 will always sink to substantially the same depth in the oil so that the air passing out at the bottom of the tubular stem 22 will always pass upwardly through the same amount or depth of oil and will always pick up or be laden with the same relative amount of oil, thus insuring the delivery at all times of a uniform quantity of oil to the parts that are to be lubricated.

In Fig. 2 I have shown a device in which the upper end of a tubular valve stem 26 on a float 32 is closed and the sides of said valve stem have perforations 27 therein that admit air when raised above the valve seat 28 and shut off the passage of air when moved downwardly. The operation of this device is substantially the same as the operation of the device shown in Fig. 1.

The foregoing description and accompanying drawings clearly disclose a preferred embodiment of my invention but it will be understood that this disclosure is merely illustrative and that such changes in the invention may be made as are within the scope and spirit of the following claims.

What I claim is:

1. In a lubricating device, a receptacle, suction operated oil inlet conduit means connected with said receptacle, vacuum conduit means connected with the upper portion of said receptacle, a valve in said vacuum conduit means, a float supported by oil in said receptacle, a tubular stem carried by said float and having an upper air intake end communicating with the atmosphere and a lower air discharge end positioned near the bottom of said receptacle, and valve means opened by the rising and closed by the lowering of said float for controlling the inlet of air.

2. In a lubricating device, a receptacle, suction operated oil inlet conduit means connected with said receptacle above the maximum oil level thereof, vacuum conduit means connected with the upper portion of said receptacle, a valve in said vacuum conduit means, means forming an air inlet passageway at the top of said receptacle, a float arranged to be supported by the oil in said receptacle, a tubular stem carried by said float and slidable in said air inlet passageway for conducting air to the lower portion of said receptacle, and valve means arranged to be closed by the rising of said float and opened by the lowering of said float for controlling the inlet of air.

3. In a lubricating device, a receptacle, conduit means through which oil may be drawn into said receptacle, a suction conduit connected with the upper portion of said receptacle, a valve in said suction conduit, means forming a vertical air inlet passageway at the top of said receptacle, a check valve in said air inlet passageway, a float, and a tubular stem secured to and extending downwardly through said float and slidable in said air inlet passageway for opening said check valve and for conducting air downwardly to a point near the bottom of said receptacle.

In witness whereof, I hereunto subscribe my name this 21st day of October, A. D. 1926.

FRANK WARREN.